United States Patent
Wang et al.

(10) Patent No.: US 11,566,336 B2
(45) Date of Patent: Jan. 31, 2023

(54) METHOD FOR TRANSFORMING A CRYSTAL FORM OF AN ELECTROLYTE CONTAINING LITHIUM FOR ALUMINUM ELECTROLYSIS

(71) Applicant: NORTHEASTERN UNIVERSITY, Shenyang (CN)

(72) Inventors: Zhaowen Wang, Shenyang (CN); Wenju Tao, Shenyang (CN); Youjian Yang, Shenyang (CN); Bingliang Gao, Shenyang (CN); Fengguo Liu, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 387 days.

(21) Appl. No.: 16/759,335

(22) PCT Filed: May 17, 2018

(86) PCT No.: PCT/CN2018/087339
§ 371 (c)(1),
(2) Date: Apr. 26, 2020

(87) PCT Pub. No.: WO2019/080487
PCT Pub. Date: May 2, 2019

(65) Prior Publication Data
US 2020/0308722 A1    Oct. 1, 2020

(30) Foreign Application Priority Data
Oct. 27, 2017 (CN) .......................... 201711024554.5

(51) Int. Cl.
| C25C 3/18 | (2006.01) |
| C01D 15/02 | (2006.01) |
| C01D 15/04 | (2006.01) |
| C01F 7/54 | (2006.01) |

(52) U.S. Cl.
CPC ............... *C25C 3/18* (2013.01); *C01D 15/02* (2013.01); *C01D 15/04* (2013.01); *C01F 7/54* (2013.01)

(58) Field of Classification Search
CPC .......... C25C 3/18; C01D 15/02; C01D 15/04; C01F 7/54; C01P 2006/32; C22B 7/00; C22B 26/12
See application file for complete search history.

(56) References Cited

U.S. PATENT DOCUMENTS

| 4,758,316 A | 7/1988 | Stewart, Jr. et al. |
| 2015/0299880 A1* | 10/2015 | Jorge ..................... C25C 3/085 |
| | | 205/560 |
| 2016/0145753 A1* | 5/2016 | Simakov ................... C25C 3/18 |
| | | 205/395 |

FOREIGN PATENT DOCUMENTS

| CN | 105293536 A | 2/2016 |
| CN | 105543504 A | 5/2016 |
| CN | 105925819 A | 9/2016 |
| CN | 107587167 A | 1/2018 |
| CN | 107915238 A | 4/2018 |
| CN | 107935015 A | 4/2018 |
| CN | 107937722 A | 4/2018 |
| CN | 107974565 A | 5/2018 |

OTHER PUBLICATIONS

Kondratev, V. V., et al. "Recycling of spent pot lining of electrolysis cells with regeneration of aluminum fluoride." International Journal of Applied Engineering Research 11.23 (2016): 11369-11373.*
English machine translation of CN105925819 (2016).*

* cited by examiner

*Primary Examiner* — Richard M Rump
(74) *Attorney, Agent, or Firm* — Bayramoglu Law Offices LLC

(57) ABSTRACT

A method for transforming a crystal form of an electrolyte containing lithium for aluminum electrolysis includes the following steps: S1, pulverizing the electrolyte containing lithium; S2, uniformly mixing an additive with the electrolyte powder to obtain a mixture, wherein the additive is one or more selected from the group consisting of an oxide of an alkali metal other than lithium, an oxo acid salt of an alkali metal other than lithium, and a halide of an alkali metal other than lithium; a molar ratio of a sum of alkali metal fluoride contained in the electrolyte, alkali metal fluoride directly added from the additive, and alkali metal fluoride to which the additive is converted under the high-temperature calcination condition in the mixture to aluminum fluoride is greater than 3; S3, calcining the mixture at a high temperature.

14 Claims, No Drawings

METHOD FOR TRANSFORMING A CRYSTAL FORM OF AN ELECTROLYTE CONTAINING LITHIUM FOR ALUMINUM ELECTROLYSIS

CROSS REFERENCE TO THE RELATED APPLICATIONS

This application is the national phase entry of International Application No. PCT/CN2018/087339, filed on May 17, 2018, which is based upon and claims priority to Chinese Patent Application No. 201711024554.5, filed on Oct. 27, 2017, the entire contents of which are incorporated herein by reference.

TECHNICAL FIELD

The present disclosure belongs to the technical field of extraction and recovery of electrolytes for aluminum electrolysis. More particularly, the present disclosure relates to a method for transforming a crystal form of an electrolyte containing lithium for aluminum electrolysis.

BACKGROUND

Bauxite resources in China are increasingly consumed with the rapid development of China's aluminum industry. Low-grade bauxite and medium-grade bauxite have been massively exploited due to the scarcity of high-grade bauxite. The low-grade bauxite and the medium-grade bauxite, especially those from China's main bauxite mining area, are rich in alkali metal elements such as lithium salts. A large amount of alumina containing lithium salts is used as a raw material for the production of aluminum by the electrolysis method. When such alumina is added into the electrolyte, these lithium salts will be enriched in the aluminum electrolytic cell during use, resulting in an increased content of lithium salt in the electrolyte for aluminum electrolysis, which diminishes the technical index of aluminum electrolysis, and severely affects the economic benefits of the aluminum electrolysis plants. Besides, with the development of industrial technology, the lithium salts have been increasingly applied in industrial fields, e.g., lithium batteries, aluminum-lithium alloys, lithium bromide air conditioners, atomic energy industry, and organic synthesis, and there is a dramatically increased demand for lithium salts. Therefore, it is of great importance to extract and recover lithium in the electrolyte for aluminum electrolysis through a reasonable process, which not only enhances the recycling of lithium resources, but also removes the effect of lithium on the production of aluminum via electrolysis and improves the economic benefits of aluminum electrolysis.

Currently, acid leaching is commonly used to dissolve lithium salts and other substances in the electrolytes for aluminum electrolysis to realize the extraction and recovery of lithium. However, the electrolytes for aluminum electrolysis contains insoluble lithium salts such as $Na_2LiAlF_6$, $NaLi_2AlF_6$, $K_2LiAlF_6$, and $KLi_2AlF_6$ that are poorly soluble in acid solutions, resulting in a low leaching rate of lithium salts. Lithium in the electrolytes for aluminum electrolysis cannot be fully extracted and recovered. Moreover, the obtained electrolytes for aluminum electrolysis has low purity, which leads to a large energy consumption during the production of aluminum via electrolysis.

In view of the above-mentioned issues, it is imperative to develop a method of changing the crystal form of the electrolyte containing lithium for aluminum electrolysis to convert insoluble lithium salts in the electrolyte into soluble lithium salts, which contributes to the subsequent extraction and recovery of lithium by acid leaching, and improves the extraction and recovery efficiency of lithium.

SUMMARY (1) Technical Problems to be Solved

In order to solve the above-mentioned problems in the prior art, the present disclosure provides a method for transforming a crystal form of an electrolyte containing lithium for aluminum electrolysis. This method is capable of changing the crystal form of the phase of lithium salts in the electrolyte for aluminum electrolysis to convert insoluble lithium salts into soluble lithium salts, which facilitates the subsequent extraction and recovery of lithium by acid leaching, and improves the leaching rate of lithium salts, thereby realizing the effective recycling of lithium salts, as well as improving the purity of the electrolyte for aluminum electrolysis and reducing the energy consumption during the production of aluminum via electrolysis.

(2) Technical Solutions

In order to achieve the above-mentioned objective, the technical solutions adopted by the present disclosure are as follows.

The present disclosure provides a method for transforming a crystal form of an electrolyte containing lithium for aluminum electrolysis, including the following steps:

S1, pulverizing the electrolyte containing lithium for aluminum electrolysis;

S2, uniformly mixing an additive with the electrolyte powder to obtain a mixture, wherein the additive is one or more selected from the group consisting of an oxide of an alkali metal other than lithium, an oxo acid salt of an alkali metal other than lithium, and a halide of an alkali metal other than lithium; the oxo acid salt of the alkali metal can be converted into an alkali metal oxide under a high-temperature calcination condition; the additive is mixed with the electrolyte powder according to a type of the additive, a molar ratio of the electrolyte, and a lithium salt content in the electrolyte by satisfying the following conditions: ensuring that a molar ratio of a sum of the alkali metal fluoride contained in the electrolyte, the alkali metal fluoride directly added from the additive, and the alkali metal fluoride to which the additive is converted under the high-temperature calcination condition in the mixture to aluminum fluoride is greater than 3;

S3, compacting or briquetting the mixture, and calcining the mixture at 300° C.-1200° C. for 1-5 hours, wherein during the calcination process, an insoluble lithium salt in the electrolyte is converted into a soluble lithium salt.

According to the present disclosure, in step S2, the oxide of the alkali metal other than lithium is one selected from the group consisting of sodium oxide, potassium oxide and a mixture of sodium oxide and potassium oxide.

According to the present disclosure, in step S2, the oxo acid salt of the alkali metal other than lithium is one or more selected from the group consisting of $Na_2SO_4$, $Na_2CO_3$, $Na_2C_2O_4$, $NaNO_3$, $CH_3COONa$, $K_2SO_4$, $K_2CO_3$, $K_2C_2O_4$, $KNO_3$, and $CH_3COOK$; wherein the oxo acid salt of the alkali metal other than lithium is converted into the alkali metal oxide under the high-temperature calcination condition.

According to the present disclosure, in step S2, the halide of the alkali metal other than lithium is one or more selected from the group consisting of NaF, NaCl, NaBr, KF, KCl, and KBr.

According to the present disclosure, the molar ratio of the sum of the alkali metal fluoride contained in the original electrolyte, the alkali metal fluoride directly added from the additive, and the alkali metal fluoride to which the additive is converted under the high-temperature calcination condition in the mixture to aluminum fluoride is 3-8:1.

Optionally, the molar ratio of the sum of the alkali metal fluoride contained in the original electrolyte, the alkali metal fluoride directly added from the additive, and the alkali metal fluoride to which the additive is converted under the high-temperature calcination condition in the mixture to aluminum fluoride is 3.5-6:1.

According to the present disclosure, the additive is pulverized before being mixed with the electrolyte.

(3) Advantages:

The advantages of the present disclosure are as follows:

The present disclosure provides a method for transforming the phase of the lithium salt in the electrolyte for aluminum electrolysis, in this method, an alkali metal salt (specifically one or more selected from the group consisting of an oxide of an alkali metal other than lithium, an oxo acid salt of an alkali metal other than lithium, and a halide of an alkali metal other than lithium, wherein the oxo acid salt of the alkali metal can be converted into an alkali metal oxide under a high-temperature calcination condition) is added to perform high-temperature calcination to convert insoluble lithium salts in the electrolyte for aluminum electrolysis into soluble lithium salts, so as to recover the high value-added lithium salt raw materials with low extraction cost, which can be applied and popularized in industrial production. Meanwhile, the industrial electrolyte with high purity is obtained and used for the production of aluminum via electrolysis, which significantly diminishes the energy consumption in aluminum production via electrolysis. For example, the concentration of LiF in the electrolyte is reduced from 5% to 1.5%, the liquidus temperature of the electrolyte can be increased by approximately 20° C., the temperature for aluminum electrolysis can be controlled at 940° C.-950° C., the current efficiency can be increased from 92% to more than 93%, the current efficiency can be increased by 1%. For an aluminum electrolysis plant with an annual output of 1 million tons, the aluminum output can be increased by 10,000 tons, and the profit can be increased by 140 million CNY (calculated on 14,000 CNY/per ton of aluminum).

The raw materials adopted by the present disclosure are commonly used in the chemical industry and are less expensive, which reduces the production cost. The present disclosure has a simple technological process, and is capable of effectively transforming the lithium salt, which facilitates the subsequent extraction and separation by acid leaching, and establishes a foundation for solving the problem of aluminum electrolysis easily being affected by lithium, as well as contributes to the increase in lithium resources. The conversion rate of the lithium salt of the electrolyte after being calcined is more than 95%, and even more than 99%. As a result of the conversion, the leaching rate of lithium salts in the electrolyte is increased from less than 5% to more than 98%.

DETAILED DESCRIPTION OF THE EMBODIMENTS

In order to expressly describe the present disclosure to facilitate an understanding, hereinafter, the present disclosure is described in detail with reference to specific embodiments.

The present disclosure provides a method for transforming a crystal form of an electrolyte containing lithium for aluminum electrolysis, including the following steps.

S1, the electrolyte containing lithium is pulverized.

S2, an additive is uniformly mixed with the electrolyte powder to obtain a mixture, wherein the additive is one or more selected from the group consisting of an oxide of an alkali metal other than lithium, an oxo acid salt of an alkali metal other than lithium, and a halide of an alkali metal other than lithium; the oxo acid salt of the alkali metal can be converted into an alkali metal oxide under a high-temperature calcination condition; the additive is mixed with the electrolyte powder according to a type of the additive, a molar ratio of the electrolyte, and a lithium salt content in the electrolyte by satisfying the following conditions: ensuring that a molar ratio of a sum of an alkali metal fluoride contained in the electrolyte, an alkali metal fluoride directly added from the additive, and an alkali metal fluoride to which the additive is converted under the high-temperature calcination condition in the mixture to aluminum fluoride is greater than 3.

S3, the mixture is compacted or briquetted, and calcined at 300° C.-1200° C. for 1-5 hours. During the calcination process, an insoluble lithium salt in the electrolyte is converted into a soluble lithium salt.

In the present disclosure, the extracted samples of electrolytes for aluminum electrolysis are respectively derived from a 300 kA electrolytic cell, a 400 kA electrolytic cell and a 200 kA electrolytic cell in some aluminum electrolysis plants. The samples are directly crushed and pulverized for analysis. The elemental compositions and content of the electrolyte are expressed by a molar ratio, an alumina concentration, a calcium fluoride concentration, and a lithium fluoride concentration. The calcinating device can be a universal muffle furnace or a belt calciner to meet the requirements for large-scale production and reduce heat consumption. Optionally, the calcinating device can also employ other heating devices or thermal insulation devices that provide a high temperature.

The electrolyte containing lithium is pulverized, and/or the additive is pulverized before being mixed with the electrolyte. In either way, the additive and the electrolyte can be fully mixed uniformly, so that insoluble lithium salts in the electrolyte are fully converted into soluble lithium salts during the high-temperature calcination process, which increases the conversion rate of lithium salts to leach more lithium salts in the acid solution, thereby improving the leaching rate of the lithium salts, and effectively recovering the lithium salts.

In step S2, the oxide of the alkali metal other than lithium can be one selected from the group consisting of sodium oxide, potassium oxide, and a mixture of sodium oxide and potassium oxide.

The addition of the oxide of the alkali metal other than lithium results in the reactions expressed by the following chemical equations:

$$3Na_2O + 2AlF_3 = 6NaF + Al_2O_3$$

$$3K_2O + 2AlF_3 = 6KF + Al_2O_3$$

In step S2, the oxo acid salt of the alkali metal other than lithium is one or more selected from the group consisting of $Na_2SO_4$, $Na_2CO_3$, $Na_2C_2O_4$, $NaNO_3$, $CH_3COONa$, $K_2SO_4$, $K_2CO_3$, $K_2C_2O_4$, $KNO_3$, and $CH_3COOK$; wherein the oxo acid salt of the alkali metal other than lithium is converted into an alkali metal oxide under the high-temperature calcination condition.

When the oxo acid salt of the alkali metal other than lithium is added, the oxo acid salt of the alkali metal can be heated and decomposed into the alkali metal oxide by the following chemical equations, and the decomposed alkali metal oxide reacts with aluminum fluoride in the same way as described above.

$$K_2CO_3 = K_2O + CO_2$$

$$Na_2NO_3 = Na_2O + NO_2$$

$$K_2C_2O_4 = K_2O + CO_2 + CO$$

$$2CH_3COONa + 3O_2 = Na_2O + 2CO_2 + 3H_2O$$

According to the present disclosure, in step S2, the halide of the alkali metal other than lithium is one or more selected from the group consisting of NaF, NaCl, NaBr, KF, KCl, and KBr.

According to the reactions of the various additives mentioned above, when a molar ratio of a sum of alkali metal fluoride contained in the electrolyte, alkali metal fluoride directly added from the additive, and alkali metal fluoride to which the additive is converted under the high-temperature calcination condition in the mixture to aluminum fluoride is greater than 3, (i.e., $LiF+NaF+KF)/AlF_3>3$), fluorides of alkali metals other than lithium and a mixture of oxides of alkali metals other than lithium and/or oxo acid salts of alkali metals other than lithium can be employed to dramatically reduce the addition of fluorides (e.g., NaF, KF) of alkali metals other than lithium in comparison with the single addition of fluorides of alkali metals other than lithium. In other words, the use of alkali metal oxides and/or alkali metal oxo acid salts can significantly cut down the production cost compared with the single addition of fluorides (e.g., NaF) of alkali metals other than lithium, and the conversion rate of lithium salts can be increased by 1%-3%. In the present disclosure, various additives can be mixed, e.g., sodium carbonate and potassium carbonate.

The typical and non-restrictive embodiments of the present disclosure are as follows.

EMBODIMENT 1

1 kg of electrolyte for aluminum electrolysis is crushed and pulverized to obtain electrolyte powder. The electrolyte has the LiF content of 5%, the KF content of 1%, and the molar ratio (molar ratio of NaF to $AlF_3$) of 2.5:1. The sodium sulfate powder after being crushed and pulverized is selected as an additive, after a calculation, the electrolyte powder and the sodium sulfate powder are uniformly mixed to prepare a mixture of sodium fluoride, lithium fluoride, potassium fluoride, and aluminum fluoride, wherein the molar ratio of a sum of lithium fluoride, sodium fluoride, and potassium fluoride to aluminum fluoride, i.e., $(LiF+NaF+KF)/AlF_3$, in the mixture is 3.8:1, and the mixture is calcined in a muffle furnace at 800° C. for 4 hours to obtain calcined products. Lithium salts in the calcined products are all converted from $Na_2LiAlF_6$, $K_2LiAlF_6$, $KLi_2AlF_6$, $NaLi_2AlF_6$ into soluble lithium salts including LiF, $Li_2O$, $Li_3AlF_6$ and others, and the conversion rate of the obtained lithium salts is 97.8%.

EMBODIMENT 2

20 kg of electrolyte aluminum electrolysis is crushed and pulverized to obtain electrolyte powder. The electrolyte has the LiF content of 5%, the KF content of 4%, and the molar ratio (molar ratio of NaF to $AlF_3$) of 2.4:1. The potassium carbonate powder after being crushed and pulverized is selected as an additive, after a calculation, the electrolyte powder and the potassium carbonate powder are uniformly mixed to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., $(LiF+NaF+KF)/AlF_3$, in the mixture is 3.5:1, and the mixture is calcined in a belt calciner at 500° C. for 3 hours to obtain calcined products. Lithium salts in the calcined products are all converted from $Na_2LiAlF_6$, $K_2LiAlF_6$, $KLi_2AlF_6$, $NaLi_2AlF_6$ into soluble lithium salts including LiF, $Li_2O$, $Li_3AlF_6$ and others, and the conversion rate of the obtained lithium salts is 98.2%.

EMBODIMENT 3

10 kg of electrolyte for aluminum electrolysis is crushed and pulverized to obtain electrolyte powder. The electrolyte has the LiF content of 7%, the KF content of 3%, and the molar ratio (molar ratio of NaF to $AlF_3$) of 2.6:1. The sodium oxalate powder after being crushed and pulverized is selected as an additive, after a calculation, the electrolyte powder and the sodium oxalate powder are uniformly mixed to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., $(LiF+NaF+KF)/AlF_3$, in the mixture is 3:1, and the mixture is calcined in a belt calciner at 300° C. for 5 hours to obtain calcined products. Lithium salts in the calcined products are all converted from $Na_2LiAlF_6$, $K_2LiAlF_6$, $KLi_2AlF_6$, $NaLi_2AlF_6$ into soluble lithium salts including LiF, $Li_2O$, $Li_3AlF_6$ and others, and the conversion rate of the obtained lithium salts is 95.4%.

EMBODIMENT 4

1 kg of electrolyte for aluminum electrolysis is crushed and pulverized to obtain electrolyte powder. The electrolyte has the LiF content of 5%, the KF content of 1%, and the molar ratio (molar ratio of NaF to $AlF_3$) of 2.5:1. The sodium carbonate powder after being crushed and pulverized is selected as an additive, after a calculation, the electrolyte powder and the sodium carbonate powder are uniformly mixed to prepare a mixture of sodium fluoride, lithium fluoride, potassium fluoride, and aluminum fluoride, wherein the molar ratio of a sum of lithium fluoride, sodium fluoride, and potassium fluoride to aluminum fluoride, i.e., $(LiF+NaF+KF)/AlF_3$, in the mixture is 4:1, and the mixture is calcined in a muffle furnace at 900° C. for 3.5 hours to obtain calcined products. Lithium salts in the calcined products are all converted from $Na_2LiAlF_6$, $K_2LiAlF_6$, $KLi_2AlF_6$, $NaLi_2AlF_6$ into soluble lithium salts including LiF, $Li_2O$, $Li_3AlF_6$ and others, and the conversion rate of the obtained lithium salts is 98.5%.

EMBODIMENT 5

20 kg of electrolyte for aluminum electrolysis is crushed and pulverized to obtain electrolyte powder. The electrolyte has the LiF content of 5%, the KF content of 4%, and the molar ratio (molar ratio of NaF to $AlF_3$) of 2.4:1. The potassium oxide powder after being crushed and pulverized is selected as an additive, after a calculation, the electrolyte powder and the potassium oxide powder are uniformly mixed to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., (LiF+NaF+KF)/AlF$_3$, in the mixture is 6:1, and the mixture is calcined in a belt calciner at 1000° C. for 1 hour to obtain calcined products. Lithium salts in the calcined products are all converted from Na$_2$LiAlF$_6$, K$_2$LiAlF$_6$, KLi$_2$AlF$_6$, NaLi$_2$AlF$_6$ into soluble lithium salts including LiF, Li$_2$O, Li$_3$AlF$_6$ and others, and the conversion rate of the obtained lithium salts is 98.7%.

EMBODIMENT 6

10 kg of electrolyte for aluminum electrolysis is crushed and pulverized to obtain electrolyte powder. The electrolyte has the LiF content of 7%, the KF content of 3%, and the molar ratio (molar ratio of NaF to AlF$_3$) of 2.6:1. The sodium oxide powder after being crushed and pulverized is selected as an additive, after a calculation, the electrolyte powder and the sodium oxide powder are uniformly mixed to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., (LiF+NaF+KF)/AlF$_3$, in the mixture is 5:1, and the mixture is calcined in a belt calciner at 1200° C. for 2 hours to obtain calcined products. Lithium salts in the calcined products are all converted from Na$_2$LiAlF$_6$, K$_2$LiAlF$_6$, KLi$_2$AlF$_6$, NaLi$_2$AlF$_6$ into soluble lithium salts including LiF, Li$_2$O, Li$_3$AlF$_6$ and others, and the conversion rate of the obtained lithium salts is 99.1%.

EMBODIMENT 7

20 kg of electrolyte for aluminum electrolysis is crushed and pulverized to obtain electrolyte powder. The electrolyte has the LiF content of 5%, the KF content of 4%, and the molar ratio (molar ratio of NaF to AlF$_3$) of 2.4:1. The potassium acetate powder after being crushed and pulverized is selected as an additive, after a calculation, the electrolyte powder and the potassium acetate powder are uniformly mixed to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., (LiF+NaF+KF)/AlF$_3$, in the mixture is 8:1, and the mixture is calcined in a belt calciner at 800° C. for 4 hours to obtain calcined products. Lithium salts in the calcined products are all converted from Na$_2$LiAlF$_6$, K$_2$LiAlF$_6$, KLi$_2$AlF$_6$, NaLi$_2$AlF$_6$ into soluble lithium salts including LiF, Li$_2$O, Li$_3$AlF$_6$ and others, and the conversion rate of the obtained lithium salts is 97.6%.

EMBODIMENT 8

10 kg of electrolyte for aluminum electrolysis is crushed and pulverized to obtain electrolyte powder. The electrolyte has the LiF content of 5%, the KF content of 1%, and the molar ratio (molar ratio of NaF to AlF$_3$) of 2.5:1. The sodium sulfate powder and the potassium carbonate powder after being crushed and pulverized are selected as the additives, after a calculation, the electrolyte powder is uniformly mixed with the sodium sulfate powder and the potassium carbonate powder to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., (LiF+NaF+KF)/AlF$_3$, in the mixture is 5:1, and the mixture is calcined in a belt calciner at 1000° C. for 5 hours to obtain calcined products. Lithium salts in the calcined products are all converted from Na$_2$LiAlF$_6$, K$_2$LiAlF$_6$, KLi$_2$AlF$_6$, NaLi$_2$AlF$_6$ into soluble lithium salts including LiF, Li$_2$O, Li$_3$AlF$_6$ and others, and the conversion rate of the obtained lithium salts is 99.4%.

EMBODIMENT 9

10 kg of electrolyte for aluminum electrolysis is crushed and pulverized to obtain electrolyte powder. The electrolyte has the LiF content of 5%, the KF content of 4%, and the molar ratio (molar ratio of NaF to AlF$_3$) of 2.4:1. The potassium sulfate powder and the sodium oxide powder after being crushed and pulverized are selected as the additives, after a calculation, the electrolyte powder is uniformly mixed with the potassium sulfate powder and the sodium oxide powder to prepare a mixture of lithium fluoride, sodium fluoride, potassium fluoride, and aluminum fluoride, wherein the molar ratio of a sum of lithium fluoride, sodium fluoride, and potassium fluoride to aluminum fluoride, i.e., (LiF+NaF+KF)/AlF$_3$, in the mixture is 7:1, and the mixture is calcined in a belt calciner at 600° C. for 3 hours to obtain calcined products. Lithium salts in the calcined products are all converted from Na$_2$LiAlF$_6$, K$_2$LiAlF$_6$, KLi$_2$AlF$_6$, NaLi$_2$AlF$_6$ into soluble lithium salts including LiF, Li$_2$O, Li$_3$AlF$_6$ and others, and the conversion rate of the obtained lithium salts is 98.5%.

It can be seen from embodiments 1-9 that, the alkali metal oxides and/or the alkali metal salts mentioned above are added and calcined at a high temperature to transform the crystal form of the phase of the lithium salt in the electrolyte for aluminum electrolysis, so that the insoluble lithium salts in the electrolyte are converted into soluble lithium salts, which facilitates the subsequent extraction and separation by acid leaching, and significantly improves the leaching rate of lithium salts. Meanwhile, high purity industrial electrolyte is obtained and can be returned to the aluminum electrolysis cell, which significantly diminishes the energy consumption in aluminum production via electrolysis. For example, the concentration of LiF in the electrolyte is reduced from 5% to 1.5%, the liquidus temperature of the electrolyte can be increased by approximately 20° C., the cell temperature for aluminum electrolysis can be controlled at 940° C.-950° C., the current efficiency can be increased from 92% to more than 93%, and the current efficiency can be increased by 1%. For an aluminum electrolysis plant with an annual output of 1 million tons aluminium, the aluminum output can be increased by 10,000 tons, and the profit can be increased by 140 million CNY (calculated on 14,000 CNY/per ton of aluminum).

In the present disclosure, a molar ratio of a sum of alkali metal fluoride contained in the electrolyte, alkali metal fluoride directly added from the additive, and alkali metal fluoride to which the additive is converted under the high-temperature calcination condition in the mixture to aluminum fluoride is 3-8:1, and is preferably 3.5-6:1. The conversion rate of lithium salts has been increased to reach more than 97% or even more than 99%. Due to the phase conversion, the leaching rate of lithium salts in the electrolyte has been increased from less than 5% to more than 98%. A high conversion rate of lithium salts can be realized by selecting a mixture of various additives.

It should be understood that the foregoing description of the specific embodiments of the present disclosure is only intended to describe the technical route and features of the present disclosure and to facilitate an understanding and implementation of the present disclosure for those skilled in the art. The present disclosure is not limited to the specific embodiments described above. Various changes or modifications made within the scope of the claims of the present disclosure shall fall within the scope of protection of the present disclosure.

What is claimed is:

1. A method for transforming a crystal form of an electrolyte containing lithium for an aluminum electrolysis, comprising the following steps:
   S1, pulverizing the electrolyte containing lithium to obtain an electrolyte powder;
   S2, uniformly mixing an additive with the electrolyte powder to obtain a mixture, wherein the additive comprises an oxo acid salt of an alkali metal excluding lithium; the oxo acid salt of the alkali metal excluding lithium is converted into an alkali metal oxide under a high-temperature calcination condition; the additive is mixed with the electrolyte powder according to a type of the additive, a first molar ratio of NaF to $AlF_3$ in the electrolyte powder, and a lithium salt content in the electrolyte powder, a second molar ratio of a sum of a first alkali metal fluoride, a second alkali metal fluoride, and a third alkali metal fluoride in the mixture to aluminum fluoride is greater than 3; wherein the first alkali metal fluoride is contained in the electrolyte powder, the second alkali metal fluoride is added by the additive, and the additive is converted to the third alkali metal fluoride under the high-temperature calcination condition; and
   S3, briquetting the mixture, and calcining the mixture at 300° C.-1200° C. for 1 hour-5 hours;
wherein during a calcination process, an insoluble lithium salt in the electrolyte powder is converted into a soluble lithium salt;
   wherein, in step S2, the oxo acid salt of the alkali metal excluding lithium is at least one selected from the group consisting of $Na_2SO_4$, $Na_2CO_3$, $Na_2C_2O_4$, $NaNO_3$, $CH_3COONa$, $K_2SO_4$, $K_2CO_3$, $K_2C_2O_4$, $KNO_3$, and $CH_3COOK$.

2. The method for transforming the crystal form of the electrolyte containing lithium for the aluminum electrolysis according to claim 1, wherein, in step S2, the additive further comprises an oxide of an alkali metal excluding lithium.

3. The method for transforming the crystal form of the electrolyte containing lithium for the aluminum electrolysis according to claim 1, wherein, in step S2, the additive further comprises a halide of an alkali metal excluding lithium.

4. The method for transforming the crystal form of the electrolyte containing lithium for the aluminum electrolysis according to claim 1, wherein, the second molar ratio is 3-8:1.

5. The method for transforming the crystal form of the electrolyte containing lithium for the aluminum electrolysis according to claim 4, wherein, the second molar ratio is 3.5-6:1.

6. The method for transforming the crystal form of the electrolyte containing lithium for the aluminum electrolysis according to claim 1, wherein, the additive is pulverized before being mixed with the electrolyte powder.

7. The method for transforming the crystal form of the electrolyte containing lithium for the aluminum electrolysis according to claim 2, wherein, the second molar ratio is 3-8:1.

8. The method for transforming the crystal form of the electrolyte containing lithium for the aluminum electrolysis according to claim 1, wherein, the second molar ratio is 3-8:1.

9. The method for transforming the crystal form of the electrolyte containing lithium for the aluminum electrolysis according to claim 3, wherein, the second molar ratio is 3-8:1.

10. The method for transforming the crystal form of the electrolyte containing lithium for the aluminum electrolysis according to claim 7, wherein, the second molar ratio is 3.5-6:1.

11. The method for transforming the crystal form of the electrolyte containing lithium for the aluminum electrolysis according to claim 8, wherein, the second molar ratio is 3.5-6:1.

12. The method for transforming the crystal form of the electrolyte containing lithium for the aluminum electrolysis according to claim 9, wherein, the second molar ratio is 3.5-6:1.

13. The method for transforming the crystal form of an electrolyte containing lithium for the aluminum electrolysis according to claim 2, wherein the oxide of the alkali metal excluding lithium is selected from the group consisting of sodium oxide, potassium oxide, and a mixture of sodium oxide and potassium oxide.

14. The method for transforming the crystal form of an electrolyte containing lithium for the aluminum electrolysis according to claim 3, wherein the halide of the alkali metal excluding lithium is selected from the group consisting of NaF, NaCl, NaBr, KF, KCl, and KBr.

* * * * *